(12) United States Patent
Connolly et al.

(10) Patent No.: US 7,715,323 B2
(45) Date of Patent: May 11, 2010

(54) METHOD FOR MONITORING BER IN AN INFINIBAND ENVIRONMENT

(75) Inventors: Brian J. Connolly, Williston, VT (US); Todd E. Leonard, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 11/750,846

(22) Filed: May 18, 2007

(65) Prior Publication Data

US 2008/0285453 A1 Nov. 20, 2008

(51) Int. Cl.
*H04J 1/16* (2006.01)
*G06F 11/00* (2006.01)

(52) U.S. Cl. .................. 370/252; 370/255; 370/213; 370/437; 714/48; 714/704

(58) Field of Classification Search .............. 370/230.1, 370/231, 235, 236, 419, 437, 465, 477, 252, 370/254, 255; 714/47, 48, 49, 704, 750, 714/774
See application file for complete search history.

(56) References Cited

U.S. PATENT DOCUMENTS

| 5,325,397 A | 6/1994 | Scholz et al. |
| 5,425,033 A | 6/1995 | Jessop et al. |
| 5,652,760 A | 7/1997 | Yamashita et al. |
| 5,699,365 A | 12/1997 | Klayman et al. |
| 6,735,725 B1 | 5/2004 | Wu et al. |
| 6,760,882 B1 | 7/2004 | Gesbert et al. |
| 6,915,463 B2 | 7/2005 | Vieregge et al. |

(Continued)

FOREIGN PATENT DOCUMENTS

JP  08223107  8/1996

(Continued)

OTHER PUBLICATIONS

A 6.4-Gb/s CMOS SerDes Core With Feed-Forward and Decision-Feedback Equalizer, Beukema et al, IEEE, 2005, pp. 2633-2643.*

(Continued)

*Primary Examiner*—Chi H Pham
*Assistant Examiner*—Ahmed Elallam
(74) *Attorney, Agent, or Firm*—Scully, Scott, Murphy & Presser, P.C.; Michael J. LeStrange, Esq.

(57) ABSTRACT

A method is disclosed for tuning each channel of a high-speed SerDes cable link interface arranged in a configuration linking a local side physical layer to a remote side physical layer. The method includes initiating an operational state of high-speed SerDes cable link interface, identifying flow-control packet Op codes not cited for use by operational high-speed SerDes cable link interface, transmitting a flow control signal from the local side physical layer to the remote side physical layer to control the remote side physical layer to monitor the bit error rate (BER) of the channels used by the local side physical layer to transfer data to the remote side physical layer, monitoring the BER in the channels used for data transfer, transferring BER data acquired in the monitoring to the local side physical layer and processing the BER data by the local side physical layer to generate equalization setting adjustments.

18 Claims, 2 Drawing Sheets

U.S. PATENT DOCUMENTS

Figure 1:
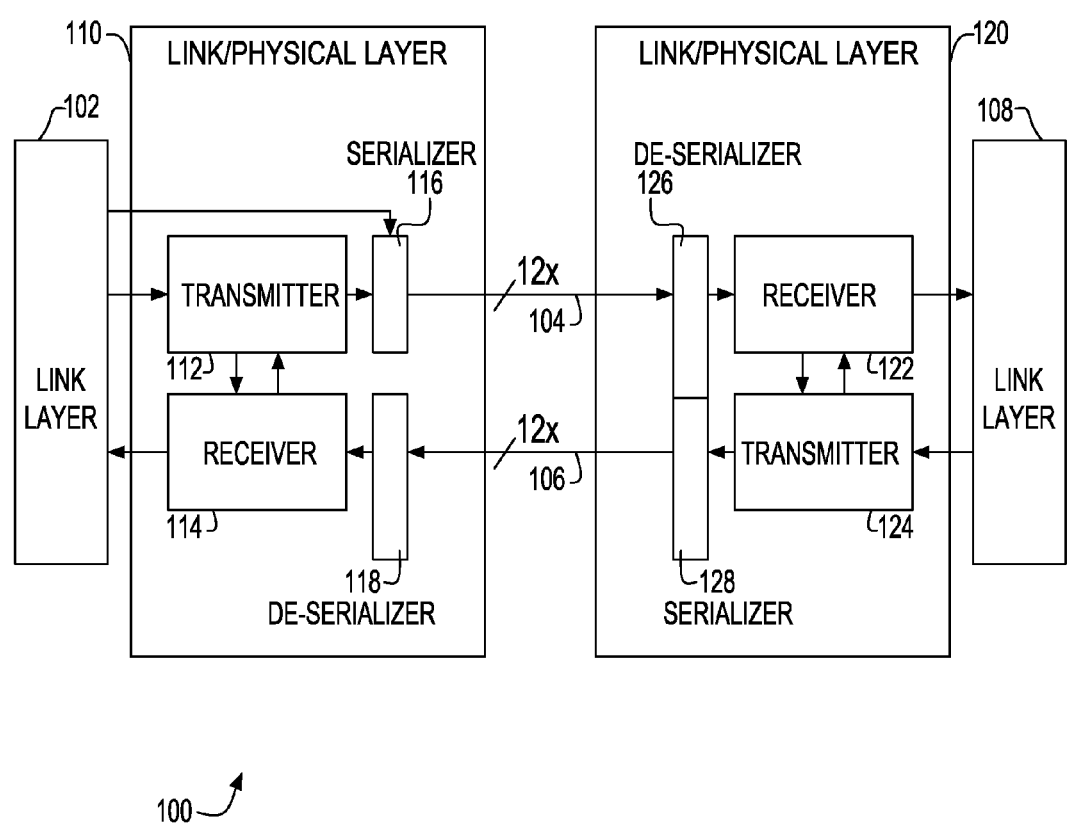

| | | | |
|---|---|---|---|
| 6,973,600 B2 | 12/2005 | Lau et al. | |
| 6,983,403 B2 * | 1/2006 | Mayweather et al. | 714/704 |
| 7,102,392 B2 | 9/2006 | Hsu et al. | |
| 7,352,815 B2 * | 4/2008 | Camara et al. | 375/257 |
| 2003/0120983 A1 | 6/2003 | Vieregge et al. | |
| 2004/0071219 A1 * | 4/2004 | Vorenkamp et al. | 375/257 |
| 2005/0123295 A1 * | 6/2005 | Hullin et al. | 398/25 |
| 2005/0163168 A1 * | 7/2005 | Sheth et al. | 370/537 |
| 2007/0127920 A1 * | 6/2007 | Ghiasi et al. | 398/25 |
| 2007/0206641 A1 * | 9/2007 | Egan | 370/479 |
| 2007/0252735 A1 * | 11/2007 | Shi et al. | 341/118 |
| 2007/0258478 A1 * | 11/2007 | Wu et al. | 370/437 |
| 2008/0002761 A1 * | 1/2008 | Edsall et al. | 375/222 |
| 2008/0013609 A1 * | 1/2008 | Daxer et al. | 375/221 |
| 2008/0187033 A1 * | 8/2008 | Smith | 375/228 |
| 2008/0192814 A1 * | 8/2008 | Hafed et al. | 375/224 |

FOREIGN PATENT DOCUMENTS

| | | |
|---|---|---|
| JP | 20002357 | 8/2000 |

OTHER PUBLICATIONS

A Multigigabit Backplane Transceiver Core in 0.13 micrometer CMOS with a Power-Efficient Equalization Architecture, Krishna et al, IEEE 2005, pp. 2658-2665.*

InfiniBand Architecture Specification vol. 2, Release 1.2, Oct. 2004. pp. 102-103,133-134, 297-298.*

"Eye Diagram Analysis Tool Persistence Histograms Measure Eye Diagram Statistics", LeCroy Applications Brief No. L.A.B. 734.

Shepard, "Evaluating oscilloscopes: Dig deeper", www.edn.com, Aug. 19, 2004, pp. 61-66.

"Modeling of Infiniband Cable Assembly from Measurements", Tektronix Enabling Innovation, www.tektronix.com/interconnect, pp. 1-10.

Ron Nikel and Hansel Collins, "Designing for Multi-Protocol SerDes: SFI, NPSI, SPI-4", analogZONE.

"High-Speed Random-Data Generator Facilitates Eye Diagrams", Dallas Semiconductor MAXIM, Feb. 1, 2005.

* cited by examiner

METHOD FOR MONITORING BER IN AN INFINIBAND ENVIRONMENT

CROSS-REFERENCE TO RELATED APPLICATION

This application is related to U.S. patent application Ser. No. 11/750,870, filed concurrently herewith, entitled: "Method For Monitoring Channel Eye Characteristics in a High-Speed SerDes Data Link," and having a common assignee, which application is incorporated in its entirety.

BACKGROUND OF THE INVENTION

The present invention relates to monitoring bit error rate (BER), and more particularly relates to monitoring high-speed serializer-deserializer (SerDes) link channels and based on the monitoring, adjusting adaptive equalization settings, if possible, to improve channel or link processing.

System architectures such as Infiniband and PCI Express utilize high-speed serializer-deserializer (SerDes) links to transmit data packets across serial links. These architectures are migrating to SerDes links that support link speeds at single data rate (SDR), double data rates (DDR) and quad data rates (QDR). In doing so, each architecture defines and provides for link-training methods that enable a high-speed SerDes link to support transmitting data at the higher data rates. One such architecture, Infiniband, provides for link operation at such higher data rates.

The Infiniband specification, Vol. 2, Rel. 1.2, supports adaptive equalization to compensate for signal distortion at the higher data rates. The Infiniband specification, section 5.6.4, Link Training State Machine, defines a procedure to enable adaptive equalization in the Infiniband system. The Link Training State Machine specification defines a 2 ms period to negotiate each side of a link's capabilities to support the SDR, DDR and QDR speeds. Once the negotiation process is completed, the Infiniband specification defines a 100 ms period to allow the default, or any of the 16 other possible (possibly available) adaptive equalization settings to be implemented across the entire link width, i.e., all of the link channels.

This solution is limited, however, in that one setting is selected for the entire link width (i.e., all of the channels). Link widths can be 1, 4, 8 and 12 channels wide using the Infiniband architecture, and up to 16 channels wide for the PCI express link architecture. In an ideal SerDes link system, every channel would be uniform and the above-mentioned method would be fine. In reality, however, this is hardly the case. That is, each medium or channel comprising the link has it own set of impedance characteristics and tolerances. The Link Training State Machine method (Infiniband) does not take into the account the varying characteristics between each channel. By limiting each channel to one set of adaptive equalization settings, some of the channels are not optimized at DDR/QDR speeds. For example, at DDR/QDR speeds, real-time operation may find that only 8 channels out of the 12 available channels in an Infiniband design are operating effectively, which would result in a significant performance degradation.

What would be desirable, therefore, is a new structure and process that allows for each channel within a high-speed Infiniband or PCI Express architecture to be independently monitored for BER, and allows the channel's adaptive equalization setting to be modified where necessary to adjust the BER in the channel in accordance with the monitored BER.

SUMMARY OF THE INVENTION

To that end, the present invention provides a system and method that allows for each channel within a high-speed SerDes link, e.g., Infiniband, PCI Express architectures, and operating at DDR/QDR speeds to independently monitor channels for BER, and where necessary, modify the channel's adaptive equalization settings to realize improved channel processing in accord with the monitoring result, i.e., the channel BER. The novel method of controlling high-speed link operation includes monitoring the bit error rate (BER) for each channel or lane, and/or the channel's eye characteristics, feeding the monitoring results back to the transmitting side of the link, and processing the data to determine whether an equalization setting modification will render improved operation. That is, using BER and eye characteristics extracted during a channel operation, the transmitting side may adjust the SerDes link coefficients to control the channel via control of the channel's adaptive equalization settings. Further, the method can be implemented by a program of instructions embedded in a non-transitory storage medium.

In a preferred mode of operation, the BER rates for each of the link's channels are monitored individually. The reader and skilled artisan alike should note that while all channels may be monitored, and data representative of said monitoring collected, not all channel data need be used for the novel channel control. That is, all monitored BER data for all monitored channels need not be passed on to the remote side of the link, but instead only one channel's (of the SerDes link) BER test data that has been determined by the receiver side to be representative of "best" operation need be passed. To do so, undefined OP codes in the flow control packets are used to pass the BER information, and/or eye diagram data, or eye patterns derived for each lane back to the transmitting link. The eye characteristics may be derived from the magnitude of the level that signals are being passed, for example, the 50% or 90% levels, eye overshoot, eye width, synchronization, etc. The transmitting link processes each lane's BER data and/or eye characteristics with a particularized function to determine if and how to best modify the transmitter (TX) settings at each lane to improve the BER, and/or eye characteristics, if possible.

Because the novel monitoring function requires a substantial period, for example, in excess of 4 ms, it runs in the background and therefore ma be implemented at any time. The adaptive equalization is typically used only during link training such as described in the Infiniband specification, Vol. 2, Rel. 1.2, and normally only looks at a 4 ms window. That is, the normal IB method for determining which of the 16 tests is the best includes looking at the BER over a 4 ms window when the link is in training, and may further include "viewing" or analyzing the eye diagram or pattern for the channel during that same period, or a different period. This is because several tests may have the same error (BER=0) over only 4 ms, so that data representing eye characteristic of each channel supports a determination of best test.

An inventive method for tuning each channel of a high-speed SerDes cable link interface (arranged to link a local side physical layer to a remote side physical layer) includes initiating an operational state of a high-speed SerDes cable link interface, identifying flow-control packet Op codes not cited for use by the operational high-speed SerDes cable link interface, transmitting a flow control signal from the local side physical layer to the remote side physical layer to control the remote side physical layer to monitor the bit error rate (BER) of the channel at the monitoring. The BER data acquired in the monitoring are transferred to the local side physical layer.

The local side physical layer processes the BER data to generate equalization setting adjustments, or modified equalization settings, where necessary. The processing preferably includes adjusting for one of the power level of each channel and the coefficient setting for each channel.

DESCRIPTION OF THE DRAWING FIGURES

Figure 2:
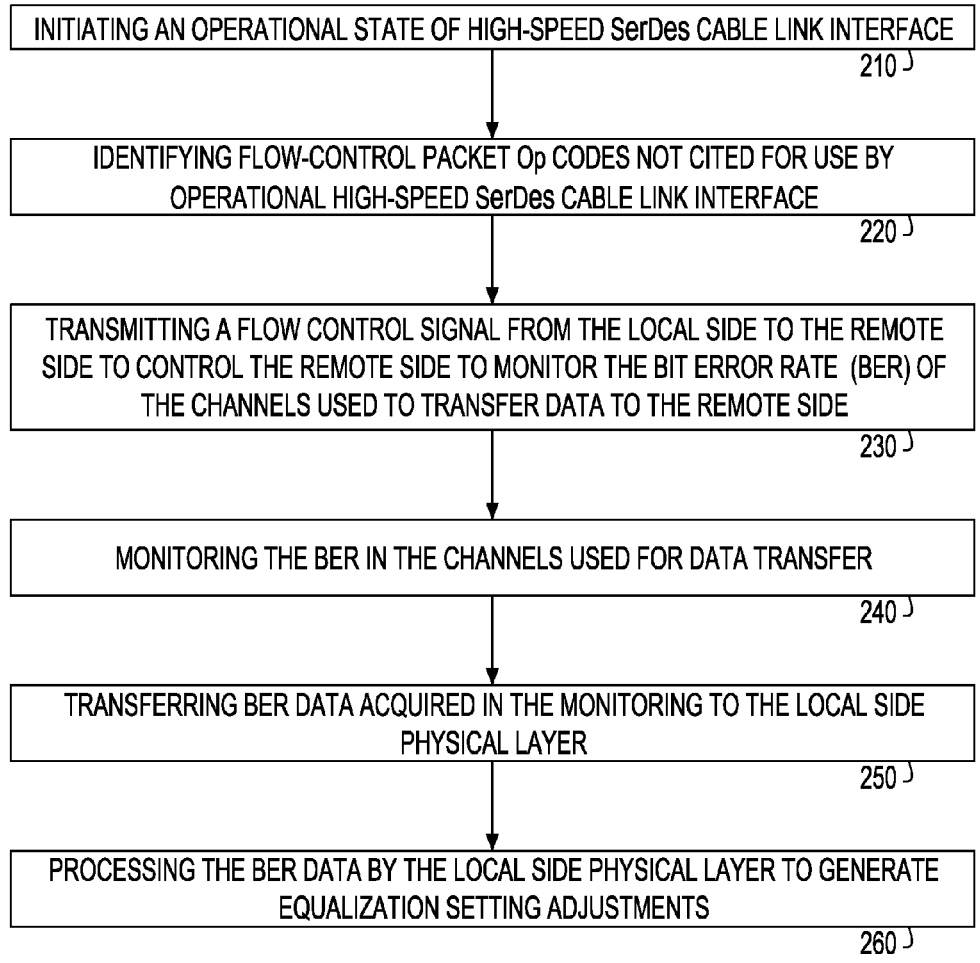

FIG. 1 is a system level diagram of a conventional Infiniband Link configuration 100 of the invention; and FIG. 2 is a schematic block diagram that depicts an inventive method for implementing improved all-channel high-speed SerDes operation of the invention.

DETAILED DESCRIPTION OF THE INVENTION

FIG. 1 is a system level diagram of an Infiniband Link configuration 100 within which an Infiniband embodiment of the invention is implemented. The reader and skilled artisan alike should realize that the FIG. 1 configuration is provided for exemplary purposes only, to explain the inventive principles, and that the invention may be implemented in any high-speed SerDes-based link architecture available, for example, PCI Express, without limitation. That is, the invention may be implemented by modifying the SerDes link architectures to use undefined OP codes in the flow control packets to pass each lane's BER information or data to the transmitting link. At the transmitting link, the received channel link BER data is processed to determine how to modify the transmitter settings and improve the lane's BER and eye characteristics. The detailed description of the invention with reference to the Infiniband architecture should not be interpreted to limit the scope and spirit of the invention in any way, particularly with respect to the invention as claimed.

FIG. 1 shows both the transmit (TX) or local side 110 of link 100, and the receiver (RX) or remote side 120 of a SerDes link within which the inventive operation is implemented. It should be noted that the convention used for the transmitter and receiver sides as shown is for exemplary purposes only, so that in any implementation, the local and remote link physical layers may be reversed. The transmitter (TX) side 110 is electrically connected to the TX device link layer, designated 102. The TX device link layer 102 connects to the TX side transmitter 112, TX side receiver 114, and TX side serializer 116. TX side receiver 114 receives data from TX side serializer 118, and provides the received data to the device link layer 102. The TX side serializer further connects to RX side deserializer 126 via Infiniband cable 104. An RX side serializer 128 connects to TX side deserializer 118 via Infiniband cable 106, and connects to RX side device link layer 108. The RX side deserializer 126 connects to RX side receiver 122, and the RX side serializer 128 connects to the RX side transmitter 124 (and the device link layer 108).

Operation of the novel high-speed SerDes architecture is as follows. Undefined OP codes in specified flow control packets are utilized by the invention to monitor the Bit Error Rate (BER), and/or eye characteristics of all the active link channels. The undefined Op codes are modified by a new function, or application, after the link system has been configured for operation. That is, once the link's system operation is defined and known to be operable, the new function analyzes the defined flow control packets and determines what undefined op codes are available for use for the inventive monitoring and communicating operation. Once known to be available, the op codes are used to define several different types of packets. The newly defined flow-control packets are used to implement the monitoring function at each of the link's channels or lanes, which are 12 in the embodiment depicted in FIG. 1.

A flow-control first packet is defined to initiate the inventive function, that is, to setup or enable the monitoring portion of the function's operation. The first or setup packet includes the time interval in which possible bit errors are collected and returned, which lanes the possible bit errors are being collected from. A second flow-control packet, referred to as an acknowledge packet, is generated to functionally acknowledge that the other side (receiver side) of the link will be able to perform (the function). The acknowledge packet includes the same information as the setup packet. The acknowledge function is limited, however, to using an available OP code that is distinct from the OP code used by the setup packet. The third flow-control packet used, referred to as a Bit Error data packet, is generated to pass back the particular Bit Error information. The Bit Error packet includes the number of bit errors detected for a lane during the fixed time interval during data transmission.

For Infiniband cable operation, the OP code field is defined at the following references:
7.9.4.1 FLOW CONTROL PACKET FIELDS
7.9.4.1.1 OPERAND (OP)-4 BITS The flow control packet is a link packet with one of two Op (operand) values: an operand of 0x0 indicates a normal flow control packet; an operand value of 0x1 indicates a flow control initialization (init) packet.

C7-55: When in the PortState LinkInitialize, flow control packets shall be sent with the flow control init operand, 0x1.

C7-56: When in the PortStates LinkArm or LinkActive, flow control packets shall be sent with the normal flow control operand, 0x0.

C7-57: All other values of the Op field are reserved for operations that may be defined by Infiniband architecture (IBA) in the future. Any packet received with a reserved value shall be discarded.

Any Op code values other then 0 or 1 may be used. If the RX side device 108 that the transmit link 110 is attached to (through receiver link 120) does not support the function, then the packet would simply be discarded. Since the requesting or transmit link 110 would therefore not receive an acknowledge packet from the device link layer 108 (communicating through RX link 120), the transmit link 110 will realize that the RX side device cannot or does not support the function.

The following example highlights the novel operation. Where the transmitter side 110 wishes to fine-tune each of it's transmit channels for transmitting data to the Receiver side 120, the transmitter side 110 first sends a flow control signal to the receiver side. At the receiver side 120, the flow control signal enables bit error monitoring. More particularly, the flow control signal identities what lanes or channels are to monitored, as well as the time interval. The time interval is preferably defined by a number of cycles that the errors should be collected (monitored). The Receiver side 120 sends the transmitter side 110 an acknowledge packet indicating what lanes and the number of cycles it will be collecting bit errors for.

At the periodic interval, the detected bit error data for each channel or lane is transmitted from the receiver side 120 to the transmitter side 110. The bit error packet is deserialized in deserializer 118, received in TX side receiver 114, and then passed to the RX side link layer 102. Link layer 102 processes the bit error data and initiates action to modify the TX side SerDes equalization settings, adjusting for either power level adjustment or coefficient setting adjustment to control the channel's operation. The inventive link configuration and operation provides what is an essentially a closed loop system that feeds back the bit error rates detected at the receiver side 120. With the bit error rates and/or eye characteristic data, the transmitter side 110 is able to adjust accordingly.

FIG. 2 sets forth a method 200 for tuning each channel of a high-speed SerDes cable link interface arranged in a configuration linking a local side physical layer to a remote side physical layer. Method 200 includes a step of initiating an operational state of high-speed SerDes cable link interface, as indicated by block 210. Block 220 represents a step of identifying flow-control packet Op codes not cited for use by operational high-speed SerDes cable link interface. Block 230 represents a step of transmitting a flow control signal from the local side physical layer to the remote side physical layer to control the remote side physical layer to monitor the bit error rate (BER) of the channels used by the local side physical layer to transfer data to the remote side physical layer. A step represented by block 240 includes monitoring the BER a in the channels used for data transfer. A block 250 represents a step of transferring BER data acquired in the monitoring to the local side physical layer. Block 260 represents a step of processing the BER by the local side physical layer to generate equalization setting adjustments.

The step of processing to generate equalization setting adjustments preferably includes adjusting for one of the power level of each channel and the coefficient setting for each channel. The method preferably includes a step of modifying the equalization settings of each channel based on the generated equalization setting adjustments. The flow control signal defines the channels to be monitored by the remote side physical layer, and the number of cycles the BER monitoring is carried out. The flow control signal is preferably included in a setup packet. After receiving the setup packet, the remote side physical layer responds by forwarding back an acknowledge packet within which the remote side physical layer provides acknowledgement it will carry out the monitoring and collecting for the channels identified. After monitoring, the remote side forwards a bit error packet within which the remote side physical layer includes the bit errors collected. Each packet is preferably generated using a separate op code.

Although a few examples of the present invention have been shown and described, it would be appreciated by those skilled in the art that changes may be made in these embodiments without departing from the principles and spirit of the invention, the scope of which is defined in the claims and their equivalents.

The invention claimed is:

1. A method for tuning at least one link channel in a high-speed SerDes cable link linking a local side physical layer to a remote side physical layer, comprising the steps of:

initiating an operational state of high-speed SerDes cable link interface;

identifying flow-control packet Op codes available for monitoring said at least one link channel in the high-speed SerDes cable link;

using the identified Op codes in a flow-control setup packet to define an interval in which bit errors are to be monitored and collected by the remote side physical layer, and link channels for which the monitoring is to be conducted;

transmitting a flow control signal from the local side physical layer to the remote side physical layer to monitor a bit error rate (BER) for each link channel used by the local side physical layer to transfer data to the remote side physical layer;

monitoring the BER for each link channel used for data transfer in accordance with the flow control signal;

generating BER data from the flow control signal;

monitoring eye characteristics for each link channel to select a best BER data for each channel;

transferring the BER data to the local side physical layer; and processing the BER data at the local side physical layer to generate equalization setting adjustments for each link channel; and adjusting each link channel in the high-speed SerDes cable link with the generated equalization setting adjustments for each link channel.

2. The method for tuning as set forth in claim 1, wherein the step of processing to generate equalization setting adjustments further includes adjusting one of: the power level of at least one link channel and the coefficient setting for at least one link channel.

3. The method for tuning as set forth in claim 1, further comprising monitoring the at least one link channel to extract data defining the at least one channel's eye characteristics, transferring the at least one link channel's eye characteristics to the local side physical layer and processing the eye characteristics to determine if link channel operation can be improved by an equalization setting adjustment.

4. The method for tuning as set forth in claim 1, wherein the step of monitoring is carried out for a fixed time period.

5. The method as set forth in claim 1, wherein the step of monitoring is carried out for a variable time period.

6. The method for tuning as set forth in claim 1, wherein the step of transmitting the flow control signal includes identifying the link channels to be monitored by the remote side physical layer, and the number of cycles the monitoring is carried out.

7. The method for tuning as set forth in claim 6, wherein the step of identifying further includes generating an acknowledge flow-control packet within which the remote side physical layer provides acknowledgement to the local side physical layer that it will carry out the monitoring and collecting for the link channels identified.

8. The method as set forth in claim 7, wherein the step of identifying further includes generating a bit error flow-control packet within which the remote side physical layer arranges data corresponding to the bit errors collected.

9. The method as set forth in claim 8, wherein each packet is generated using a separate flow-control Op code.

10. The method as set forth in claim 7, wherein each packet is generated using a separate flow-control Op code.

11. The method as set forth in claim 1, wherein an Op code value may be used that is other than 0 or 1.

12. A computer program product for tuning at least one link channel in a high-speed SerDes cable link interface arranged in a configuration linking a local side physical layer to a remote side physical layer comprising:

a non-transitory storage medium readable by machine, tangibly embodying a program of instructions executable by the machine to perform method steps for:

initiating an operational state of high-speed SerDes cable link interface;

identifying flow-control packet Op codes available for monitoring said at least one link channel in the high-speed SerDes cable link;

using the identified Op codes in a flow-control setup packet to define an interval in which bit errors are to be monitored and collected by the remote side physical layer, and the link channels for which the monitoring is to be conducted;

transmitting a flow control signal from the local side physical layer to the remote side physical layer to monitor a bit error rate (BER) for each link channel used by the local side physical layer to transfer data to the remote side physical layer;

monitoring the BER in at least one link channel used for data transfer in accordance with the flow control signal;

generating BER data from the flow control signal;

monitoring eye characteristics for each link channel to select a best BER data for each link channel;

transferring BER data acquired in the monitoring to the local side physical layer; and processing the BER data by the local side physical layer to generate equalization setting adjustments for the at least one channel; and adjusting each link channel in the high-speed SerDes cable link with the generated equalization setting adjustments for each link channel.

13. The computer program product as set forth in claim 12, further including modifying each link channel's equalization settings in accordance with the equalization setting adjustments.

14. The computer program product of claim 12, wherein the step of processing to generate equalization setting adjustments further includes adjusting one of: the power level of at least one link channel and the coefficient setting for at least one link channel.

15. The computer program product of claim 12, further comprising monitoring the at least one link channel to extract data defining the at least one channel's eye characteristics, transferring the eye characteristics to the local side physical layer and processing the eye characteristics to determine if channel operation can be improved by an equalization setting adjustment.

16. The computer program product of claim 12, wherein the step of transmitting the flow control signal includes identifying the link channels to be monitored by the remote side physical layer, and the number of cycles the monitoring is carried out.

17. The computer program product of claim 16, wherein the step of identifying further includes generating an acknowledge flow-control packet within which the remote side physical layer provides acknowledgement to the local side physical layer that it will carry out the monitoring and collecting for the link channels identified.

18. The computer program product of claim 17, wherein the step of identifying further includes generating a bit error flow-control packet within which the remote side physical layer arranges data corresponding to the bit errors collected.

* * * * *